(12) United States Patent
Colica

(10) Patent No.: US 10,117,417 B2
(45) Date of Patent: Nov. 6, 2018

(54) AUTOMATIC WATER SUPPLY SYSTEM FOR ANIMALS

(71) Applicant: Pegasus Unlimited, LLC, Cortaro, AZ (US)

(72) Inventor: Anthony L. Colica, Tucson, AZ (US)

(73) Assignee: PEGASUS UNLIMITED, LLC, Cortaro, AZ (US)

( * ) Notice: Subject to any disclaimer, the term of this patent is extended or adjusted under 35 U.S.C. 154(b) by 108 days.

(21) Appl. No.: 14/887,118

(22) Filed: Oct. 19, 2015

(65) Prior Publication Data
US 2016/0174522 A1 Jun. 23, 2016

Related U.S. Application Data

(60) Provisional application No. 62/093,618, filed on Dec. 18, 2014.

(51) Int. Cl.
| A01K 7/00 | (2006.01) |
| A01K 7/02 | (2006.01) |
| G05D 9/12 | (2006.01) |
| A01K 29/00 | (2006.01) |

(52) U.S. Cl.
CPC ............. *A01K 7/027* (2013.01); *A01K 7/02* (2013.01); *A01K 29/005* (2013.01); *G05D 9/12* (2013.01)

(58) Field of Classification Search
CPC . A01K 7/027; A01K 7/02; A01K 7/00; A01K 7/04; A01K 29/005; G05D 9/12
USPC ...................................................... 119/61.57
See application file for complete search history.

(56) References Cited

U.S. PATENT DOCUMENTS

| 3,027,872 | A | * | 4/1962 | Nelson | A01K 7/04 |
| | | | | | 119/73 |
| 4,153,011 | A | | 5/1979 | Weissman et al. | 119/72 |
| 4,183,327 | A | * | 1/1980 | Olsen | A01K 5/0291 |
| | | | | | 119/51.11 |
| 4,202,294 | A | | 5/1980 | Kasai | 119/78 |
| 5,052,343 | A | | 10/1991 | Sushelnitski | 119/78 |
| 5,231,953 | A | * | 8/1993 | Garrett | A01K 5/0114 |
| | | | | | 119/61.52 |
| 5,255,632 | A | | 10/1993 | Thomas et al. | 119/51.5 |
| 6,866,005 | B1 | | 3/2005 | Bunker | 119/72 |
| 7,124,709 | B1 | * | 10/2006 | Greer | A01K 5/0114 |
| | | | | | 119/61.5 |
| 7,284,500 | B2 | * | 10/2007 | Denny | A01K 5/01 |
| | | | | | 119/61.57 |
| 7,328,671 | B2 | * | 2/2008 | Kates | A01K 15/02 |
| | | | | | 119/719 |
| 8,464,661 | B1 | * | 6/2013 | Dunn | A01K 7/02 |
| | | | | | 119/73 |
| 8,555,814 | B2 | | 10/2013 | Parks et al. | 119/51.5 |
| 9,609,847 | B2 | * | 4/2017 | Van Der Poel | A01K 7/02 |

(Continued)

OTHER PUBLICATIONS

Canadian Office Action issued in application No. 2,915,843, dated Feb. 13, 2018 (4 pgs).

*Primary Examiner* — Joshua D Huson
(74) *Attorney, Agent, or Firm* — Hayes Soloway P.C.

(57) ABSTRACT

An automatic animal watering system including a basin having an interior wall defining a water holding trough, and an outer wall; a non-contact water level sensor built into the interior wall; a drain located in a lower portion of the basin; and electronic circuitry, power source and a solenoid valve contained in a protected space between the inner and outer walls of the basin.

18 Claims, 7 Drawing Sheets

(56) References Cited

U.S. PATENT DOCUMENTS

| | | | |
|---|---|---|---|
| 2005/0241589 A1* | 11/2005 | Forster | A01K 5/0216 119/74 |
| 2008/0035241 A1* | 2/2008 | Wittbold | A01K 7/06 141/361 |
| 2010/0175625 A1* | 7/2010 | Klenotiz | A01K 7/06 119/75 |
| 2015/0208609 A1* | 7/2015 | Tillet | A01K 7/02 119/74 |
| 2015/0237826 A1* | 8/2015 | Van Der Poel | A01K 7/02 119/74 |

* cited by examiner

WALL

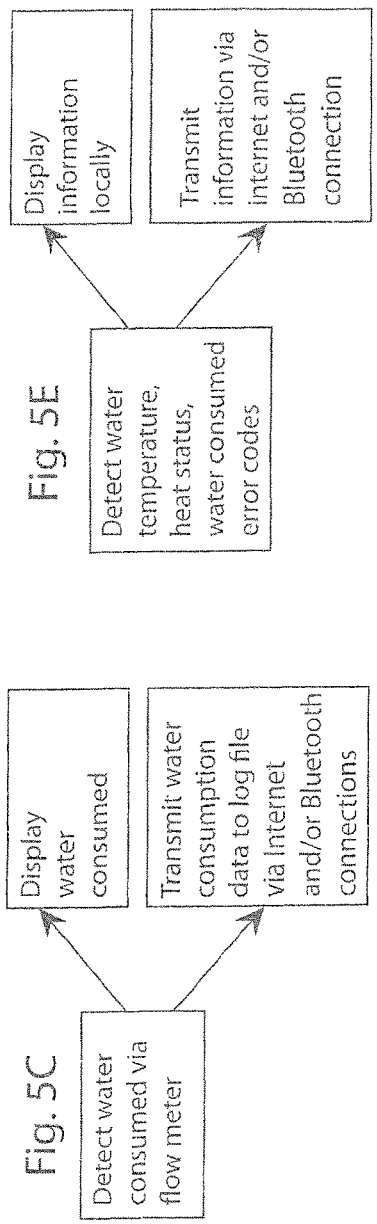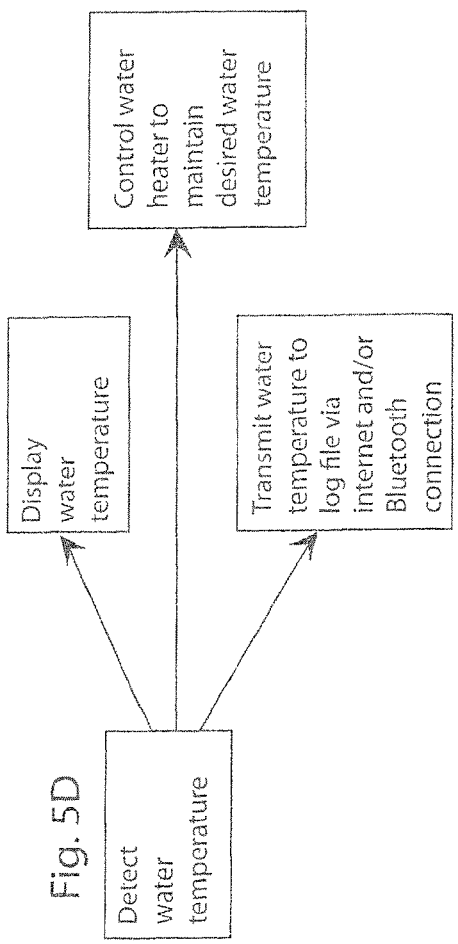

AUTOMATIC WATER SUPPLY SYSTEM FOR ANIMALS

CROSS REFERENCE TO RELATED APPLICATIONS

This application claims priority from U.S. Provisional Application Ser. No. 62/093,618 filed Dec. 18, 2014, the contents of which are incorporated herein by reference.

FIELD OF THE INVENTION

The present invention relates to automatic water supply system for animals. The invention has particular utility for use as automatic water supply system for large domesticated animals such as horses, and will be described in connection with such utility, although other utilities are contemplated.

BACKGROUND OF THE INVENTION

Prior art automatic drinking water supply systems for animals typically employ a contact type water flow control means such as a float valve which is installed within or adjacent the water drinking trough. However float valves are prone to malfunction due to contact by the animal which may damage or dislodge the float valve causing the valve to stick in either an open or closed position. When stuck in an open position, the water trough may overflow resulting in a waste of water and formation of mud adjacent the water trough. And, if the float valve is stuck in a closed position, the animal may become dehydrated. For large animals such as horses and cattle who might consume 5 to 10 gallons of water, or more, daily, particularly in warmer climates, maintaining an adequate supply of drinking water is imperative for the animal's health.

SUMMARY OF THE INVENTION

The present invention overcomes the aforesaid and other problems of the prior art, by providing an automatic, self-contained watering system having a non-contact water level sensor and controller for operating the valve.

In a preferred embodiment the non-contact water level sensor comprises an infrared sensor.

In another embodiment, the watering system comprises a stainless steel basin having an interior wall defining a water holding trough and an outer wall. The non-contact sensor is built into the interior wall, and electronic circuitry, power source and solenoid valve are all contained in the space between the interior and the outer wall so as to be protected from the animal.

In a preferred embodiment a drain is located in a lower portion of the basin.

In another embodiment, heat wrap tape is provided around the basin.

In another and preferred embodiment, the drain includes a tee fitting for accommodating a valved water inlet and a valved drain or expandable plug drain.

Power of the circuit and solenoid valve may be a self-contained battery power, power from a distributed power supply, or a solar energy power supply system.

BRIEF DESCRIPTION OF THE DRAWINGS

Further features and advantages of the present invention will be seen from the following detailed description, taken in conjunction with the accompanying drawings, wherein:

FIGS. 5A-5E are block flow diagrams showing operation thereof; and

DETAILED DESCRIPTION

Figure 1:
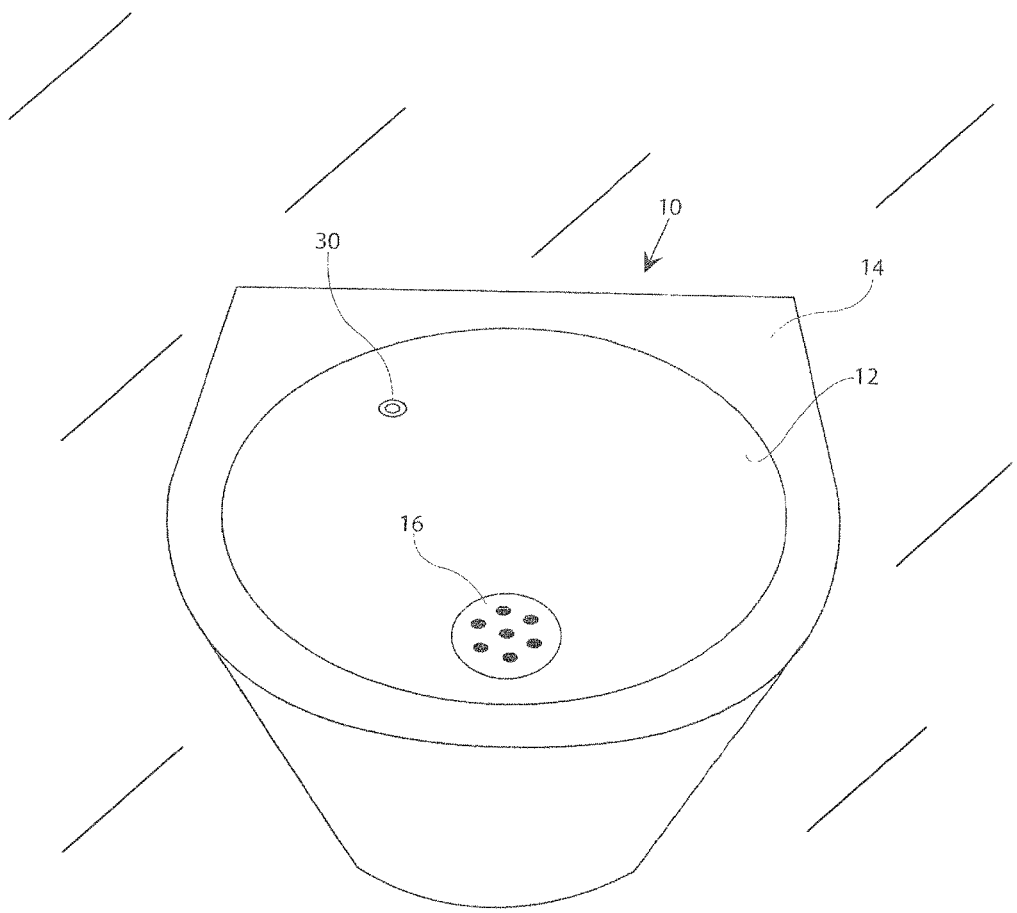
FIG. 1 comprises a front perspective view of an automatic water supply system in accordance with the present invention.
Figure 2:
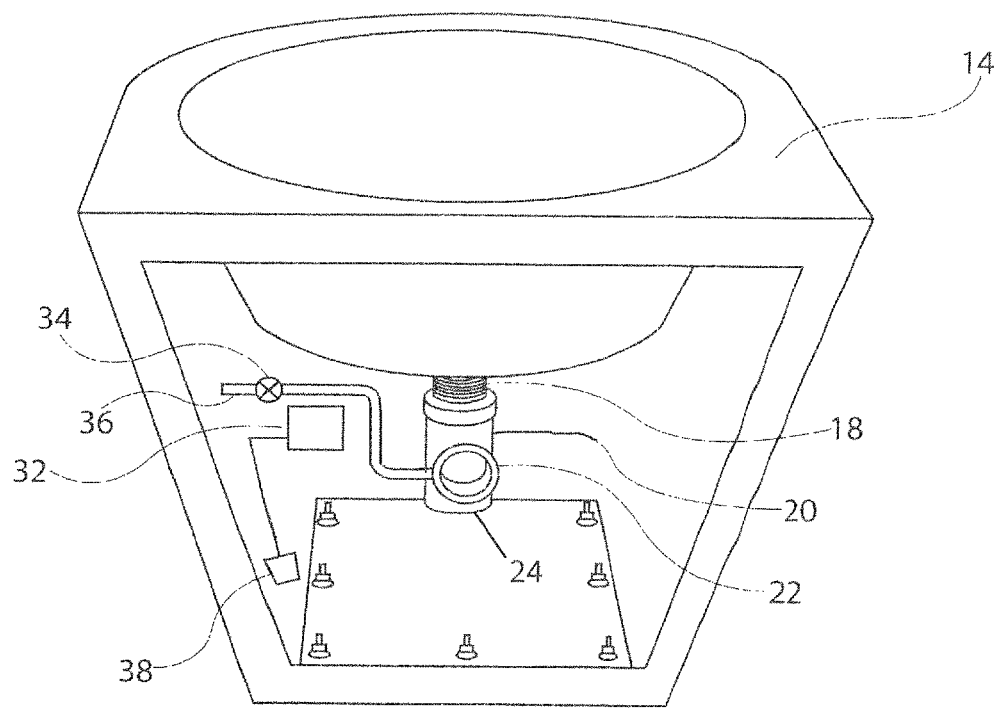
FIG. 2 is a back perspective view thereof.
Figure 3:
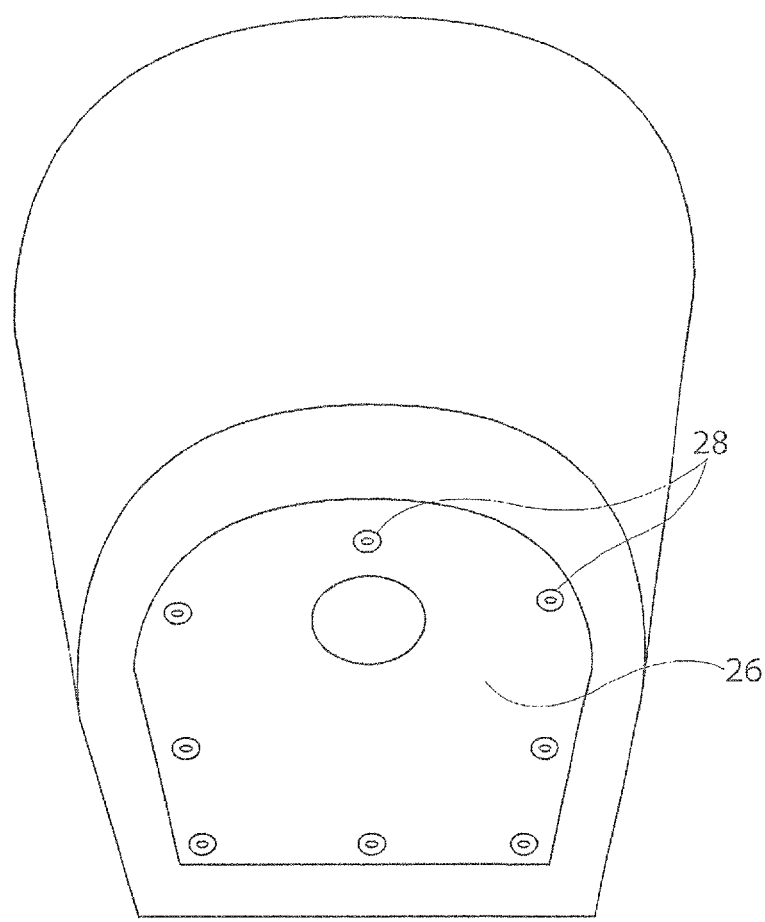
FIG. 3 is a bottom perspective view thereof.

Referring to FIGS. 1-3, an automatic water supply system in accordance with the present invention includes a basin 10 having an interior wall 12 and an outer wall 14. Interior wall 12 defines a bowl shaped drinking trough having a perforated drain 16 at its lowest point.

Figure 5A:
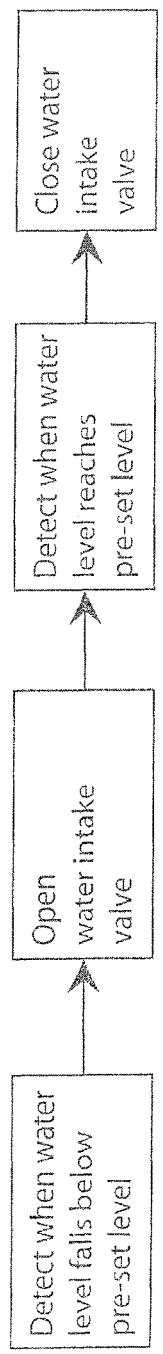
Figure 5B:
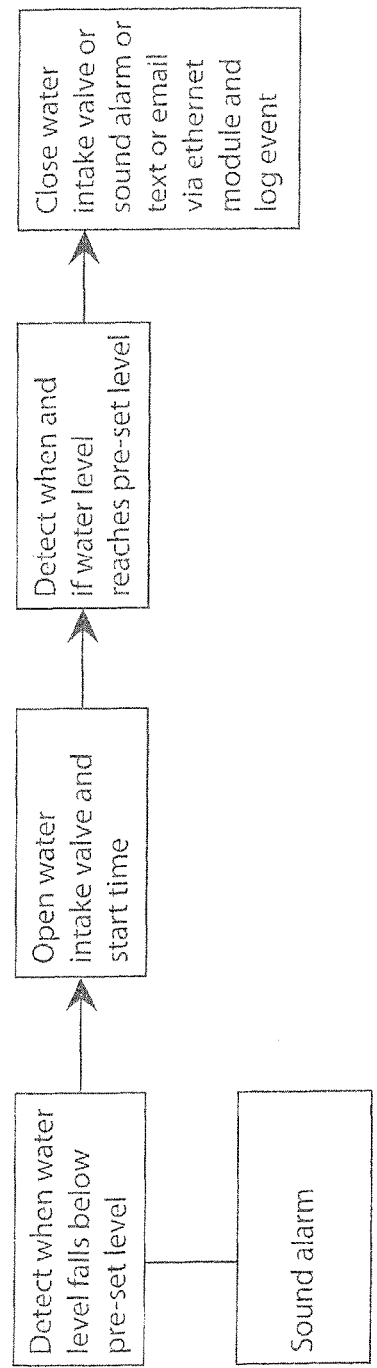
Figure 6:
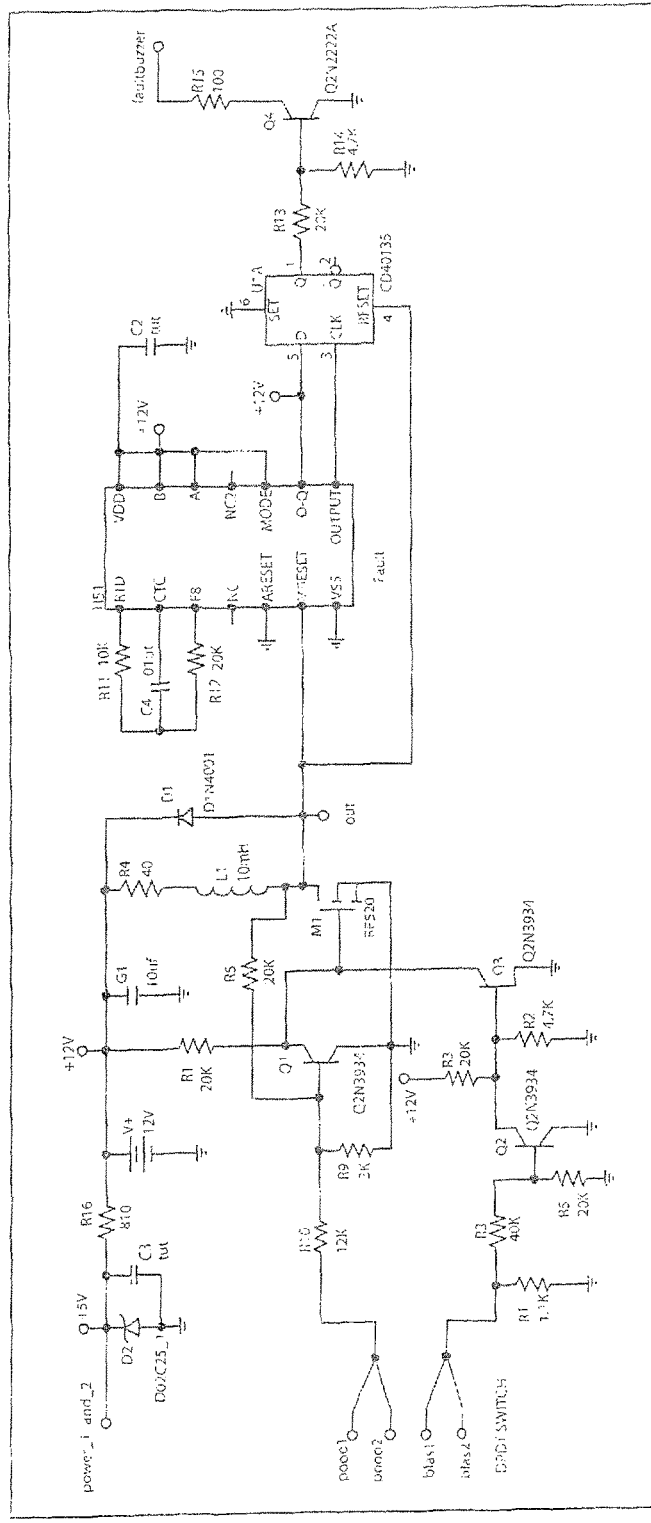
FIG. 6 is a schematic diagram of the water level sensor and valve control of the present invention.

Referring in particularly to FIGS. 2 and 3, drain 16 is connected to a drain pipe 18 which in turn is connected to a tee fitting 20 which includes a side port 22 to which is connected a valved water inlet as will be described in detail below, and a straight port 24 which is connected to a valve or expandable plug for draining the bowl as will be described below. Basin 10 is closed at its bottom by a removable access plate 26 which is affixed to the bottom by a plurality of fasteners 28, and creates an interior, protected cavity 29. It is not necessary to close off the hack of the basin 10 since it will be mounted to a wall. An infrared sensor 30 is mounted through the interior wall 12 of the basin to detect if there is water present at the surface of its lens. Sensor 30 is mounted so that it is flush with the inner wall 12 forming the basin. Sensor 30 is connected to a micro-controller 32 located in the interior protected cavity 29 of the basin 10. A schematic for micro-controller 32 for driving the sensor 30 and solenoid valve 34 is shown in FIG. 5. Micro-controller 32 in turn is connected to a solenoid valve 34 which in turn is connected to a pressurized water supply line 36. A power supply 38 may be a self-contained battery power, power from a distributed power supply, or a solar energy power supply system, powers the micro-controller 32 and the solenoid valve 36.

Completing the automatic water supply system is a clean-out valve or expandable plug 40 (see FIG. 4) which is inserted into the straight port 24 of tee fitting 20.

Figure 4:
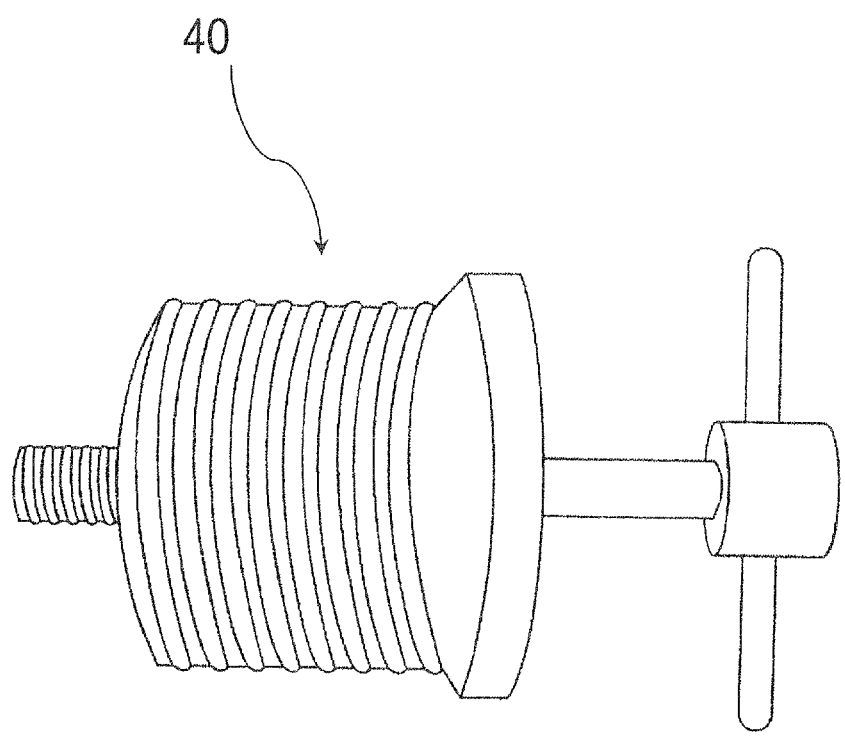
FIG. 4 is a side elevational view of a drain plug.

Referring also to FIG. 4, in operation, sensor 30 detects if water is present at the surface of its lens, and if no water is detected, it sends a signal to micro-controller 32 which in turn sends power to solenoid valve 36 which opens the valve and permits water to flow through the valve to fill the basin. The basin fills with water through the perforated drain 16 until the water level reaches the lens 30 which then sends a signal to the micro-controller 32 which in turn sends a signal to valve 36 to turn the valve off.

A feature and advantage of the automatic drinking water supply system of the present invention is that the sensor is mounted flush with the basin wall, and that the valve, micro-controller and power supply are all within the interior protected cavity 29 of the basin 10, shielded from contact by the animal, thus eliminating problems of prior art float valve systems.

Various changes may be made without departing from the spirit and scope of the invention. For example while a preferred sensor system is an infrared sensor system other non-float type sensor systems including, for example, ultrasonic sensor systems and conductivity sensor systems advantageously may be employed. Also, multiple sensors may be placed at different levels in the basin 10 so that the user may choose between multiple water levels. Also, referring to FIG. 5B, if desired, a low water level sensor may be provided to sound an alarm, e.g. trigger a local sound or light signal and/or a remote speaker or light, send a text and/or email through an attached Ethernet module for remote notification, and recorded in a log file viewable through an internet and/or bluetooth connection, if the water level drops below a pre-determined level (indicating that there is a problem with the water source, e.g., frozen or broken line clogged valve, etc.) and/or does not return to the target level sensor after a pre-set period of time. Still other changes are possible. For example, referring to FIG. 5C, a water flow meter may be employed to display the amount of water consumed during a time period, e.g., the current day (since midnight) and the prior day. In addition, this data may be recorded in a log file viewable remotely through an internet and/or bluetooth connection. Also, if desired, as illustrated in FIG. 5D, a temperature sensor may be installed at each trough with the temperature reading displayed locally and recorded in a remote log file viewable through an internet and/or bluetooth connection. In addition, the temperature sensor 96 may be adapted to control a heating element 98 or heat wrap tape 100 attached to the trough to maintain a predetermined minimum water temperature. In yet another embodiment, illustrated in FIG. 5E, an LED or liquid crystal screen 102 may be incorporated into the design to locally display the amount of water consumed, the current temperature at the location of the trough, the status of the heater (whether it is on/off), as well as other useful information such as error codes, etc., and also, if desired, transmit such information through an internet and/or Bluetooth connection to a remote log file. And, while the automatic water supply system has been described for use for installation on a wall of a structure such as a barn or horse stall, the automatic water supply system also may be installed, for example, in a corner intersection of two walls of a structure, or on the wall of a horse or livestock trailer. In such embodiment, a water supply reservoir should be included. The reservoir may be mounted above the trough, in which case water will flow under gravity into the watering trough when the valve is opened. Alternatively, a water pump may be provided in line between the reservoir and the watering trough, connected to the power supply and valve.

Also, the water trough could be scaled for domestic pets such as dogs and cats. Still other changes are possible.

The invention claimed is:

1. A wall mounted automatic animal watering system for large domesticated animals comprising:
   a basin, said basin having an interior wall defining a water holding trough, an outer wall open at its back, and a removable access plate affixed to an open bottom of the outer wall; wherein said interior wall, said outer wall, the wall to which the watering system is mounted and said removable access plate together enclose and define an interior protected cavity;
   a plurality of non-contact water level sensors mounted at different vertical locations built into the interior wall wherein one of the plurality of water level sensor is arranged as a low water level sensor, and is arranged to trip a low water level signal;
   a drain including a tee fitting including a straight port and a side port, connected to the drain and located below the basin;
   a water inlet connected to a solenoid valve in communication with the side port of the tee fitting, and a removable stopper or cleanout valve in communication with the straight port of the tee fitting, wherein the tee fitting, the solenoid valve and the removable stopper or cleanout valve are all contained within the interior protected cavity; and
   electronic circuitry and a power source also contained within the interior protected cavity,
   wherein the solenoid valve, removable stopper or cleanout valve, electronic circuitry and power source are all accessible through the open bottom of the outer wall by removing the access plate, while leaving the water holding trough in place, mounted on the wall, whereupon the water holding trough may be drained and cleaned without being removed from the wall to which the animal watering system is mounted.

2. The automatic watering system of claim 1, wherein the power source comprises a battery.

3. The automatic watering system of claim 1, wherein the power source comprises a connection to a distributed power supply.

4. The automatic watering system of claim 1, wherein the power source comprises a connection to a solar energy power supply system.

5. The automatic watering system of claim 1, further comprising heat wrap tape in contact with the basin.

6. The automatic watering system of claim 1, wherein the water level sensor comprises an infrared sensor mounted in a wall of the basin.

7. The automatic watering system of claim 6, wherein the infrared sensor is mounted flush with the wall of the basin.

8. The automatic watering system of claim 1, wherein the low water level signal comprises a sound or light signal.

9. The automatic watering system of claim 1, wherein the low water level sensor is adapted to sound an alarm or trigger a light signal if the water level drops below a pre-determined level and does not return to a target level after a pre-set period of time.

10. The automatic watering system of claim 9, and further comprising recording an error message in a processor file.

11. The automatic watering system of claim 10, further including an internet or Bluetooth connection for sending the error message to a remote processor log file.

12. The automatic watering system of claim 1, further including a water flow meter for displaying an amount of water consumed during a time period.

13. The automatic watering system of claim 12, further comprising an internet or Bluetooth connection for sending water consumption information from the water flow meter to a log file viewable remotely.

14. The automatic watering system of claim 1, further comprising a temperature sensor through which a temperature reading may be made and displayed locally.

15. The automatic watering system of claim 14, wherein the temperature sensor is adapted to control a heating element for maintaining a pre-determined minimum water temperature.

16. The automatic watering system of claim 14, further comprising an internet or Bluetooth connection for sending temperature readings from the temperature sensor to a remove log file.

17. The automatic watering system of claim 1, further comprising an LED or liquid crystal screen for displaying an amount of water consumed, a current water temperature, status of a water heater.

18. The automatic watering system of claim 1, wherein the low water level sensor is adapted to send a notification via an internet or Bluetooth connection to a remote site, if the water level drops below a pre-determined level and does not return to a target level after a pre-set period of time.

* * * * *